Oct. 31, 1950     J. COLLARD     2,527,918
METHOD OF MINIMIZING REFLECTION OF RADIO WAVES
Filed Sept. 11, 1946
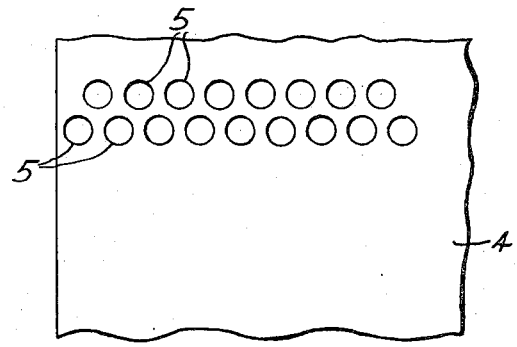
FIG-1
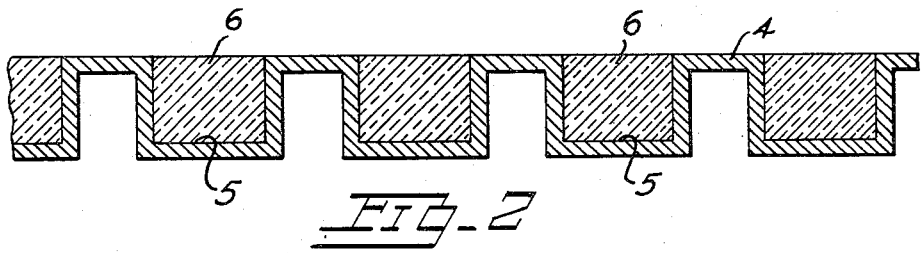
FIG-2
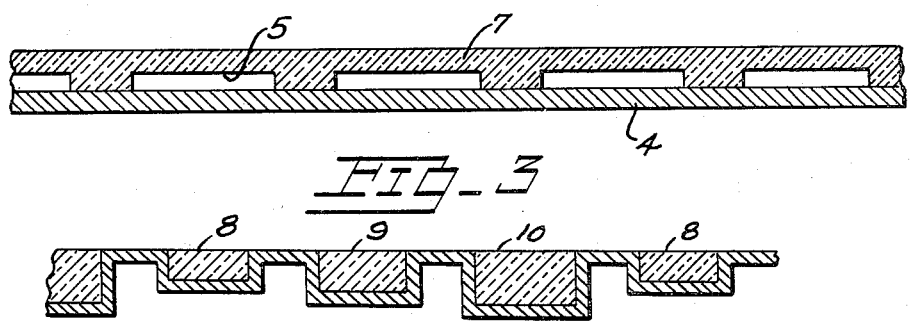
FIG-3
FIG-4
INVENTOR.
JOHN COLLARD
BY H.G. Grover
Attorney Patented Oct. 31, 1950

2,527,918

UNITED STATES PATENT OFFICE 2,527,918

METHOD OF MINIMIZING REFLECTION OF RADIO WAVES

John Collard, Hammersmith, London, England, assignor to Electric and Musical Industries, Limited, a British company Application September 11, 1946, Serial No. 696,134
In Great Britain August 26, 1943

Section 1, Public Law 690, August 8, 1946
Patent expires August 26, 1963

5 Claims. (Cl. 343—18)

This invention relates to reducing the intensity of electro-magnetic waves reflected from reflecting objects which are normally detectable by radar.

In apparatus for detecting the presence of reflecting objects by radar a focused beam of high frequency electro-magnetic waves is radiated and reflected by the object, the time taken for the beam to reach the object and to return to the receiver being a measure of the distance of the object from the transmitter which radiated the beam. In such methods of detecting the presence of reflecting objects it is known that a maximum reflected signal is received only when the object is normal to the axis of the radiated beam and if the radiated beam strikes the object obliquely to its surface the reflected beam is of small intensity. For this reason it is usual to arrange the receiver close to the transmitter so that the receiver will receive only those waves which are reflected from the object when the radiated beam impinges on the object normally.

The purpose of the present invention is to reduce the intensity of electro-magnetic waves reflected from objects, such as aircraft and other objects, which can be located by similar locating apparatus, when the waves impinge on the object normally so making the object more difficult to detect.

The present invention is based on the principle of causing the electrical path length of some of the waves in a beam to be so different from the electrical path lengths of other waves in the beam before they are reflected that the relative phases of the waves are such as to cause substantial neutralization after reflection whereby the intensity of the resultant reflected wave is reduced. It will be appreciated that if the surface of the object is effectively divided into two areas and one of these areas is effectively a quarter of a wavelength farther from the transmitter than the other area, then some of the waves in the transmitted beam after reflection from the farther area will, by the time they return to the plane of the other area, be 180° out of phase with the waves at the latter area with the result that the waves tend to neutralize one another so that the resultant reflected waves are substantially reduced. Thus, providing the reflecting object is as far as possible divided into two areas such that the electrical path length of some of the waves in a beam travel half a wavelength farther than the other waves in the beam, the object can be rendered substantially "invisible" to the detecting beam.

Thus, according to the invention there is provided an object which is normally detectable by radar wherein a substantial part of the surface of said object is effectively divided into two areas and one of said areas is arranged at a distance from the other area so that the electrical path length of some of the waves in the radiated beam before reflection by said object is different from the electrical path length of other waves in the beam, the arrangement being such that a beam of electro-magnetic waves impinging on said object and having a wavelength which is substantially effectively equal to four times the electrical distance between said areas will produce a resultant reflected wave which is of less intensity than would otherwise be the case.

In practice, the surfaces of an object from which a beam can be reflected will probably not be flat over substantial areas so that only relatively small portions of them can be considered as geometrical planes, with the result that each small area of the surface should be constructed so as to have areas thereon which cause a radiated beam to travel different electrical distances before reflection. For example, a multiplicity of small recesses may be provided on the object.

In order that the said invention may be clearly understood and readily carried into effect the same will now be more fully described with reference to the accompanying drawings, in which:

Figure 1 is a plan view of a portion of the wing of an aircraft to which the invention is applied, Figure 2 is a cross-sectional view on an enlarged scale of some of the recesses shown in Figure 1, Figure 3 is a cross-sectional view of a modification of the invention, and Figure 4 is a cross-sectional view of a further modification of the invention.

Referring now to Figures 1 and 2 of the drawings, Figure 1 illustrates the invention as applied to the wing of an aircraft, although it will be appreciated that not only the wings, but also the fuselage and other parts of the aircraft, will require to embody the invention so as to make the aircraft as a whole less detectable by radar. In the example of the invention shown in Figures 1 and 2, the surfaces of the wing of an aircraft indicated at 4 are provided with a plurality of substantially flat-bottomed recesses 5, the recesses being of circular form. It will of course be appreciated that the recesses may be of any other suitable form. The depth of each recess is made effectively equal to a quarter of the wavelength of the high frequency waves of radar beam and the total area occupied by the recesses is preferably such as to be equal to the remaining unrecessed reflecting area of the object. Since the bottoms of the recesses are a quarter of a wavelength away from the adjacent unrecessed area of the object, waves reflected from the bottoms of the recesses will travel one-half a wavelength longer than the waves reflected from the unrecessed area so as to be 180° out of phase with the latter waves so as to provide substantial neutralization of the reflected waves. The provision of said recesses thus effectively divides the surface of the aircraft into two areas, one of which is arranged at a predetermined electrical distance from the other area so that when a radar beam impinges on said object, the beam having a wavelength of four times the electrical distance between said areas, the reflected beam will be of less intensity than would be the case if no recesses were provided.

It is desirable that the area of each recess should be as small as possible so as to provide substantial neutralization particularly if the reflecting object has a contour which is very different from a geometrical plane. However, if the area of each recess is too small the recesses can be considered as short lengths of waveguide with the result that they may fail to transmit the radiated beam if their area is smaller than the critical value for transmitting waves having a wavelength of the radiated beam. This fact therefore sets a limit to the smallest area of recess that can be employed.

In applying the invention to an object such as an aircraft, it may be undesirable to leave open recesses over the areas of the wings or fuselage owing to the resultant increase in air friction which would arise. To avoid this difficulty the recesses may be filled with a solid dielectric material 6 made flush with the surface of the aircraft adjacent said recesses. This not only avoids any increase in wind friction but also has two further advantages in that the depth of the recesses can be made smaller providing a suitable dielectric material is chosen. For example if the dielectric constant of the material were 4 the physical depth of the recesses could be reduced to half which may in some cases facilitate the provision of the recesses. The second advantage is that the recesses can be made of smaller area since by filling the recesses with dielectric material having a suitable constant, the critical area when the recesses are regarded as waveguides, is reduced. Dielectrics are known having a filler of titanium dioxide in which the dielectric constant is of the order of 100. If such a dielectric were used the depth of the recesses could be reduced to one-tenth. Thus, if the wavelength of the waves in the radiated beam were 10 cms., the physical depth of each recess would be 2.5 mms., or if the waves had a wavelength of 3.2 cms., the physical depth of the recesses would be 0.8 mms. Thus by filling the recesses with dielectric material the consequent small physical depth of the recesses which thereby results when the object is to be detected by the beams of customary wavelengths renders the treatment of a surface very convenient in practice. The small physical depth of the recesses will therefore permit the recesses to be formed in the surface of an object, such as an aircraft, by embossing or similar methods. Obviously, instead of employing circular recesses, recesses of other shapes may be employed or the surface of the object could be corrugated.

Instead of forming the recesses in the reflecting surface of the object the recesses 5 as shown in Figure 3 may be formed in the surface of a sheet of dielectric material 7 which covers the surface of the object. The recesses are preferably provided on the surface of the sheet of dielectric material which is in contact with the object so that a smooth surface of dielectric material is exposed. In this case the depth of each recess is such that waves travelling through the recess and back in the dielectric are half a wavelength behind those travelling the same distance in air. If desired, of course, the recesses in the dielectric sheet may be filled with a substance having a different dielectric constant from that of the sheet.

Although the electrical depth of the recesses is preferably such as to be equal to a quarter of a wavelength of the energy in the detecting beam, it is to be understood of course that the electrical depth of the recesses can be made effectively equal to a quarter of a wavelength by making the recesses equal in depth to any odd number of quarter wavelengths. If the recesses are formed for use to counteract detecting beams of a wavelength of 10 cms., it is thought that the construction will be reasonably effective over a range of wavelengths from about 8.7 to 12 cms. Furthermore, a quarter wavelength at 10 cms., constitutes three-quarters of a wavelength at 3.3 cms, and hence a recess a quarter of a wavelength in electrical depth designed for use with a beam of 10 cms. wavelength would also be effective over a band centered at 3.3 cms., and also over a band centered at 1.1 cms. Referring to Figure 4, if it is thought desirable to render the object substantially less reffective over a wide band of wavelengths, some of the recesses 8 may be of a depth suited for one wave length and others 9, 10 for a depth suited for another wavelength or wavelengths. Thus, by suitably arranging recesses of different depths it is possible to provide substantial neutralization for each wavelength of detecting beam that is likely to be encountered.

Although the invention has been described above as applied mainly to rendering an aircraft substantially non-reflective, it will be understood that the invention is equally applicable to other reflecting objects, such as submarines or tops of buildings.

I claim as my invention:

1. An object which is normally detectable by radar wherein a substantial part of the surface of said object is effectively divided into two areas by the provision of a multiplicity of small separated recesses formed in the reflecting surface of said object, the area occupied by said recesses being substantially equal to the unrecessed area.

2. An object according to claim 1, wherein said recesses are filled with solid dielectric material which is made flush with the surface of the object adjacent said recesses.

3. An object according to claim 1, wherein said reflecting surface includes a covering of dielectric material and said recesses are formed in said dielectric material, the area occupied by said recesses being substantially equal to the unrecessed area.

4. An object according to claim 1, wherein said reflecting surface includes a covering of dielectric material and said recesses are formed in said dielectric material and are filled with a substance having a different dielectric constant from that of said material, the area occupied by said recesses being substantially equal to the unrecessed area.

5. An object according to claim 1 in which the surface of said object is effectively divided into more than two areas by the provision of recesses of different depths so that said object will produce a resultant reflected wave which is of less intensity than would otherwise be the case for radar beams of different wavelengths.

JOHN COLLARD.

REFERENCES CITED

The following references are of record in the file of this patent:

UNITED STATES PATENTS

| Number | Name | Date |
|---|---|---|
| 1,119,543 | Sabine | Dec. 1, 1914 |
| 1,554,180 | Trader | Sept. 15, 1925 |
| 2,096,233 | Ericson | Oct. 19, 1937 |
| 2,292,444 | Haydon | Aug. 11, 1942 |
| 2,464,006 | Tiley | Mar. 8, 1949 |

FOREIGN PATENTS

| Number | Country | Date |
|---|---|---|
| 802,728 | France | Sept. 14, 1936 |